(12) United States Patent
Rickert et al.

(10) Patent No.: US 7,043,891 B2
(45) Date of Patent: May 16, 2006

(54) CROP FILTER AUGER FOR A CROP INTAKE ASSEMBLY

(75) Inventors: Clemens Rickert, Stadtlohn (DE); Norbert Boeckmann, Stadtlohn (DE)

(73) Assignee: Maschinenfabrik Kemper GmbH & CO KG, Stadtlohn (DE)

( * ) Notice: Subject to any disclaimer, the term of this patent is extended or adjusted under 35 U.S.C. 154(b) by 0 days.

(21) Appl. No.: 10/824,924

(22) Filed: Apr. 15, 2004

(65) Prior Publication Data

US 2004/0231309 A1 Nov. 25, 2004

(30) Foreign Application Priority Data

Apr. 16, 2003 (DE) ............... 103 17 469

(51) Int. Cl.
*A01D 45/02* (2006.01)
(52) U.S. Cl. ...................................... 56/119
(58) Field of Classification Search .............. 56/119, 56/60, 208, 103, 80, 94, 95, 105
See application file for complete search history.

(56) References Cited

U.S. PATENT DOCUMENTS

| | | | | |
|---|---|---|---|---|
| 3,171,241 A | * | 3/1965 | Streb | 56/33 |
| 3,451,200 A | * | 6/1969 | Phares | 56/33 |
| 3,484,802 A | * | 12/1969 | Rerce et al. | 56/13.3 |
| 3,714,767 A | * | 2/1973 | Hubbard et al. | 56/208 |
| 5,490,372 A | * | 2/1996 | Schlueter | 56/33 |

FOREIGN PATENT DOCUMENTS

| | | |
|---|---|---|
| DE | 2 61 748 | 6/1913 |
| DE | 8 49 775 | 9/1952 |
| DE | 3231953 A1 * | 3/1984 |

* cited by examiner

*Primary Examiner*—Árpád Fábián Kovács

(57) ABSTRACT

A crop lifter auger is rotatably driven by a drive. The crop lifter auger has a first forward end and a second rear end. The drive drives the crop lifter auger at the first forward end. The first forward end of the crop lifter auger is pivotally mounted whereas the second rear end can be fixed into different positions.

14 Claims, 3 Drawing Sheets

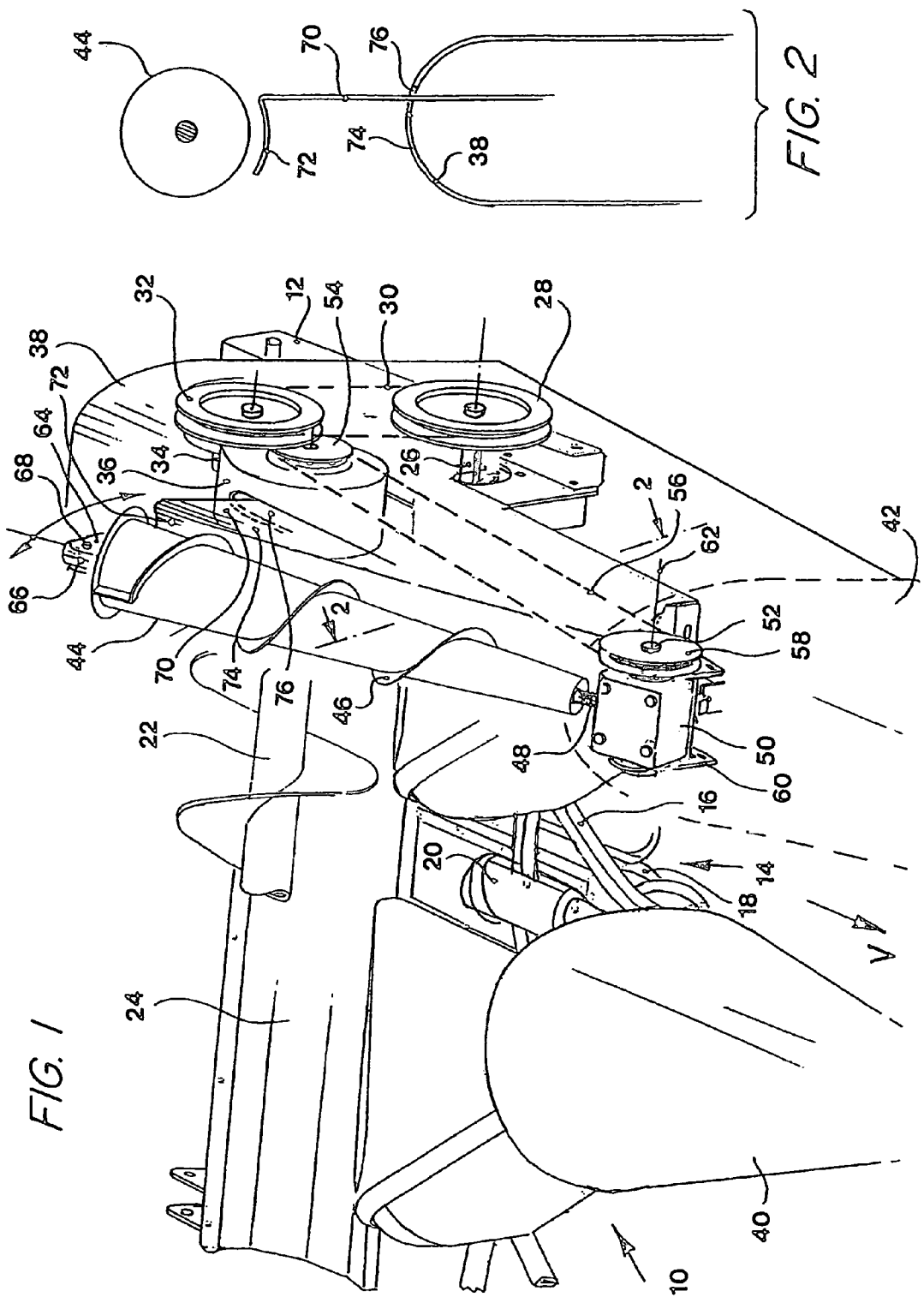

CROP FILTER AUGER FOR A CROP INTAKE ASSEMBLY

FIELD OF THE INVENTION

The present invention is directed to a crop lifter auger having a first end and a second end. The first end is movably mounted on a crop intake assembly and the second end can be fixed into different positions on the crop intake assembly.

BACKGROUND OF THE INVENTION

In harvesting corn with a corn picker or forage harvester, it is often found to be advantageous to provide a crop lifter auger at one or both sides of the crop intake assembly. This crop lifter auger is sometimes referred to as a "corn auger" or "silage auger". The auger is in the form of a conical screw conveyor which extends generally in the direction of travel of the harvesting machine. The conveyor is rotated by a drive. The conveyor is also inclined upward and rearward from an apex which is disposed on its forward end. It conveys lying plants upward and rearward wherewith they are taken up by the stream of crop material.

SUMMARY OF THE INVENTION

A crop lifter auger is rotatably driven by a drive. The crop lifter auger has a first forward end and a second rear end. The drive drives the crop lifter auger at the first forward end. The first forward end of the crop lifter auger is pivotally mounted whereas the second rear end can be fixed into different positions.

BRIEF DESCRIPTION OF THE DRAWINGS

FIG. 1 is a perspective view of a part of a crop intake assembly, illustrating a first embodiment of the present invention.

FIG. 2 is a cross section along line 2—2 of FIG. 1.

DETAILED DESCRIPTION

Figures 3, 4:
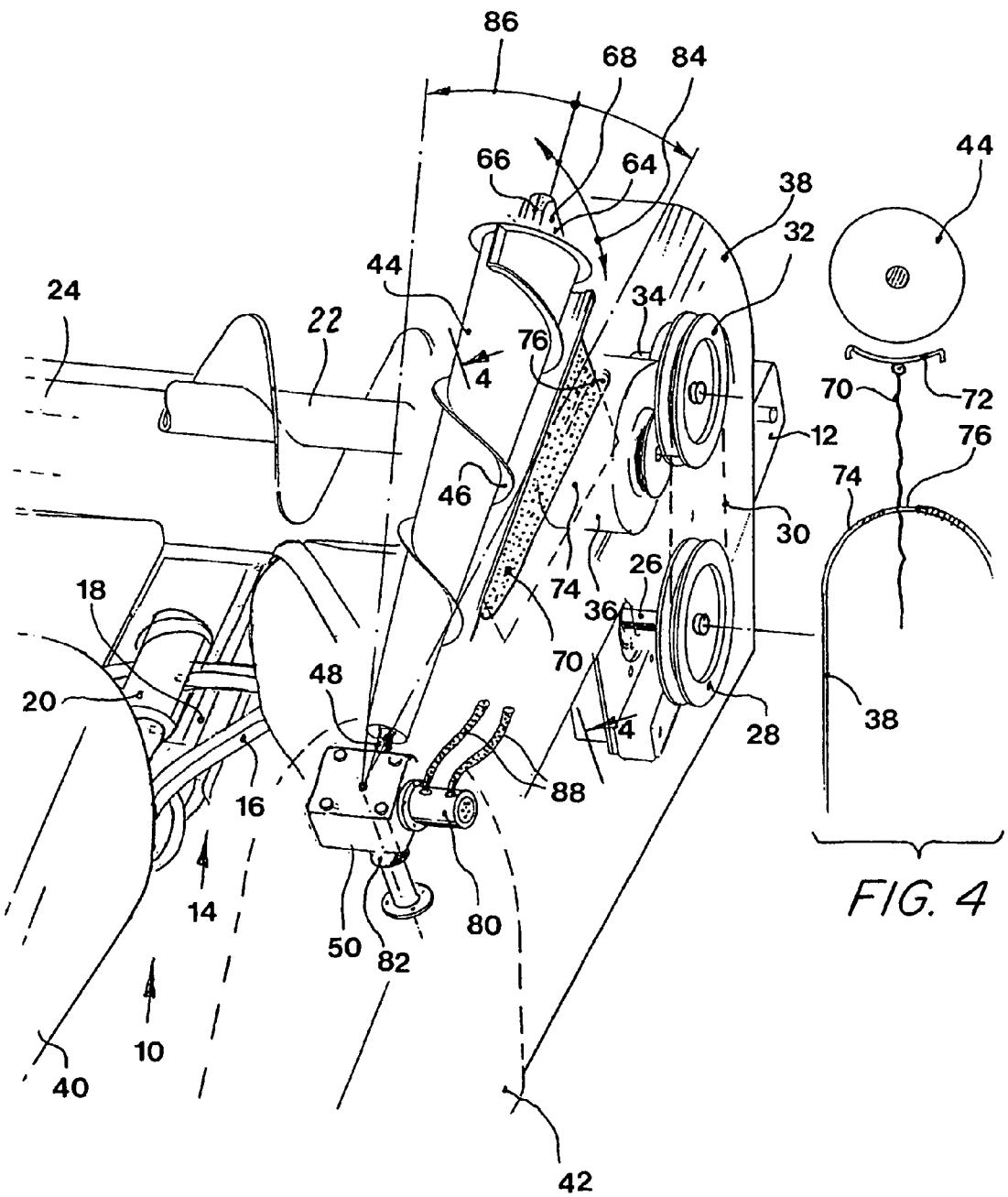
FIG. 3 is a perspective view of a part of a crop intake assembly, illustrating a second embodiment of the present invention.
FIG. 4 is a cross section along line 4—4 of FIG. 2.

FIG. 1 shows the right outer region, relative to the forward direction of travel V, of a crop intake assembly 10 in the form of a corn picker. It is comprised of a frame 12 on which a series of inward pulling picking units 14 are disposed. Each picking unit comprises: an inward pulling gathering conveyor device which rotates around the vertical axis and is provided with crop engaging members 16; a picking gap 18 with picking rolls disposed thereunder; and an upper inward pulling auger 20 which serves to introduce the crop material (particularly corn) into the picking gap 18. The basic structure of the inward pulling picking units 14 is described in detail in DE 101 53 198 A, the disclosure of which is incorporated in the present document by reference.

At the rear side of the inward pulling and picking units 14 a trough 24 and a transverse screw conveyor 22 are disposed, which serve to convey the picked parts of the plants to a self-propelled harvesting machine (e.g. a thresher or chopper).

The inward pulling picking units 14 are driven from the self-propelled harvester via a transverse shaft which extends over the width of the crop intake mechanism 10 and which drives the transverse screw conveyor 22 via a first drive pulley 28, a belt 30, and a second drive pulley 32, as well as a second transmission mechanism having two gears (34, 36). The described transmission elements are disposed in protected spaces on the right side of the crop intake mechanism 10, interiorly of a housing 38 which has the shape of an inverted U.

Forwardly tapering crop dividers 40 which taper essentially to a point are disposed between the individual inward pulling picking units 14. These crop dividers 40 separators direct the plants (which are standing in the field and are not disposed exactly ahead of the picking gaps 18) into the area of influence of the crop engaging members 16 and the upper inward pulling auger 20. A similar, outer crop divider 42 is also mounted on the right side (relative to the forward direction of travel V) of the crop intake assembly 10. At the rear end of the outer crop divider 42 the divider extends around the forward region of the housing 38, so that there are no major projections or the like onto which the plants can become caught.

A crop lifter auger 44 extends from the rear end of the outer stem separator 42 and above the housing 38, in a rearward and upward direction. The crop lifter auger 44 comprises: a conical body the apex of which is disposed forwardly in the forward direction V and the expansion of which progresses with rearward progression; and a conveying helix 46 which is disposed around said conical body.

The crop lifter auger 44 is rotationally driven by a drive and serves to lift the corn and to convey it into the outer inward pulling picking unit 14.

At the forward (first) end (disposed forwardly in the forward direction V) of the crop lifter auger 44, the auger is connected to a drive shaft 48 of a gear drive 50. A drive shaft 52 of the right angle gear drive 50 is drivably connected to the transverse screw conveyor 22 via a third drive pulley 54, a second belt 56, and a fourth pulley 58. During the harvesting process the crop lifter auger 44 is driven in rotation via the described drive train and the gear drive 50, which drive 50 may comprise meshed bevel gears. The drive shaft 52 and driven shaft 48 are rotatably mounted in the housing of the gear drive 50. The gear drive 50 and the forward region of the crop lifter auger 44 are protectedly disposed below the rear region of the outer crop divider 42.

The housing of the gear drive 50 is mounted so as to be freely pivotal around the axis 62 of the drive shaft 52 in a trunnion-like mount 60. Thereby the crop lifter auger 44 is freely pivotal at its forward end, along with the housing of the gear drive 50.

At its rear (second) end, the crop lifter auger 44 is supported on the frame 12 by an adjustable mount 64. The adjustable mount 64 has a forked configuration in its upper region and is connected to an arm 66 which is rotatably mounted at the rear end of the crop lifter auger 44, thereby allowing said auger 44 to pivot around a horizontal pivot shaft 68 which is transverse to the direction of forward travel V. The pivot shaft 68 is linked to the forked mount 64 in the upper region of the mount. The mount 64 is fixed to the frame 12 by suitable means such that the altitude of said mount 64 is adjustable. The altitude of the rear end of the crop lifter auger 44 can be freely adjusted for given harvesting conditions by loosening a holding device (e.g. a cotter pin, nut, eccentric lever, or screw), adjusting the altitude of the mount 64, and then re-fixing the holding device to the frame 12. When this is done, it is unnecessary to also adjust the drive means, because the arrangement of the gear drive 50 provides the necessary adjustment automatically.

A first side wall 70 is located below the crop lifter auger 44. The rear end of the first side wall 70 is either pivotably mounted to the adjustable mount 64 or is rigidly mounted to the arm 66. The forward end of the first side wall 70 is pivotably mounted around the axis 62. The first side wall 70 is thus swung in unison with the crop lifter auger 44, so that the distance between the auger 44 and the first side wall 70 remains constant. An upper region 72 of the first side wall 70 extends partially around the crop lifter auger 44 to form a trough. The first side wall 70 may be comprised of sheet metal or rubber. In order to prevent losses of ears of corn and the like and to avoid parts of plants from being trapped in the space between the first side wall 70 and the second side wall 74 formed by the housing 38, the first side wall 70 passes through a slot 76 in the second side wall 74. This provides a smooth transition between the first side wall 70 and the second side wall 74.

FIG. 3 illustrates a segment of a crop intake mechanism 10 having a second embodiment of the crop lifter auger 44 and the mounting and drive means therefor. Elements corresponding to those of the first embodiment have been provided with like reference numerals; hence no further description is necessary of these elements.

In contrast to the first embodiment, the crop lifter auger 44 is not driven mechanically via the gear drive 50, but rather hydraulically, namely by a hydraulic motor 80. Also, the gear drive 50 is pivotably mounted on its underside to the frame 12 of the crop intake mechanism 10 via a ball joint 82. The ball joint 82 allows the forward end of the crop lifter auger 44 to be moved around both a vertical axis and a horizontal axis transverse to the forward direction V. One might also elect to directly connect the output shaft of the hydraulic motor 80 with the forward end of the crop lifter auger 44, with the housing of the motor 80 being mounted on the ball joint 82. The ball joint 82 may be supplied with releasable securing or locking means which are released prior to an adjustment of the auger 44 and are then re-engaged.

The ball joint 82 and the rear mount of the crop lifter auger 44 allow the rear end of the crop lifter auger 44 to be adjusted in the lateral and vertical directions, as indicated by arrows 86 and 84. The mount 64 is thus adjustable vertically and in a direction generally transverse to the forward direction, in the connection of said mount 64 to the frame 12. The gear drive 50, the crop lifter auger 44 rigidly connected to the driven shaft 48 from gear drive 50, and the hydraulic motor 80, are carried along with this adjusting displacement. The hydraulic motor 80 is supplied with pressurized hydraulic fluid via flexible hoses 88, from the harvester or from a pump disposed on the crop intake mechanism 10. The flexibility of the hoses 88 allows pivoting movement of the hydraulic motor 80.

A further difference in comparison to the first embodiment is that the first side wall 70 is comprised of a cloth or rubberized fabric which is attached in the middle of the trough-shaped region 72, which region 72 is comprised of a generally rigid material such as metal or plastic, and is also fixed to the arm 66 or the mount 64. The high flexibility of the wall 70 composed of this material readily permits horizontal adjustment of the trough 72 along with the crop lifter auger 44.

Figure 5:
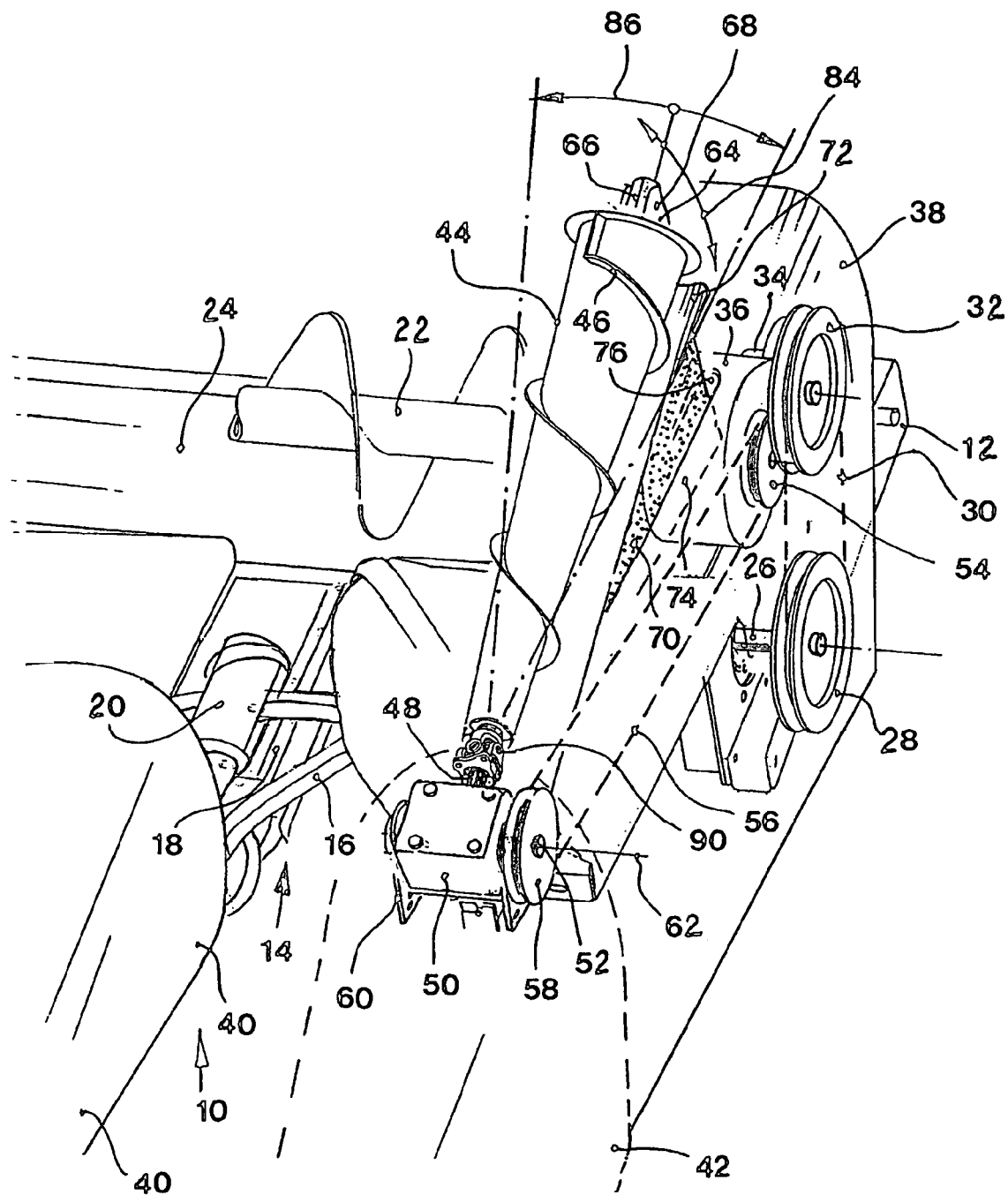
FIG. 5 is a perspective view of a part of a crop intake assembly, illustrating a third embodiment of the present invention.

Finally, FIG. 5 illustrates a third embodiment of an inventive crop lifter auger 44, and the mounting and drive therefor. Elements corresponding to those of the first embodiment have been provided with like reference numerals.

The third embodiment is generally similar to the first embodiment. The gear drive 50 is mechanically driven by the second belt 56, and the housing of drive 50 is pivotal in the trunnion-like mount 60, around a horizontal axis which extends transversely to the direction of forward travel and which coincides with the rotational axis 62 of the drive shaft 52 of the gear drive 50. In contrast to the first embodiment, the driven shaft 48 of the gear drive 50 is not rigidly joined to the forward end of the crop lifter auger 44, but rather is linked via a universal joint 90. This allows the rear end of the crop lifter auger 44 to move also in a horizontal direction as indicated by arrow 86. The mount 64 is accordingly configured as in the embodiment illustrated in FIG. 3, such that the first side wall 70 is flexible in order to accommodate the describe horizontal movement.

The trunnion-like mount 60 may be provided with releasable securing or locking means for the housing of the gear drive 50. It should be noted that the gear drive 50 may alternatively be rigidly mounted to the mount 60, provided that the universal joint 60 allows an appropriate vertical adjustment range for the rear end of the crop lifter auger 44.

Having described the illustrated embodiments, it will become apparent that various modifications can be made without departing from the scope of the invention as defined in the accompanying claims.

The invention claimed is:

1. A crop lifter auger having a first end and a second end, the crop lifter auger driven by a drive shaft, the crop lifter auger is movably mounted on the first end and can be fixed into different positions at the second end; characterized in that the drive shaft is driven on the first end of the crop lifter auger wherein the first end of the crop lifter auger is the forward end as related to a forward direction of travel.

2. The crop lifter auger as defined by claim 1 wherein the crop lifter auger is pivotably mounted on its first end and is adjustably supported on its second end.

3. The crop lifter auger as defined by claim 2 wherein the crop lifter auger is pivotal around a horizontal pivot axis oriented transversely to the direction of forward travel.

4. The crop lifter auger as defined by claim 3 wherein the crop lifter auger is pivotably mounted on its first end so as to be pivotal around an approximately vertical axis.

5. The crop lifter auger as defined by claim 4 wherein the crop lifter auger is driven by a mechanical drive.

6. The crop lifter auger as defined by claim 4 wherein the crop lifter auger is driven by a hydraulic drive train.

7. The crop lifter auger as defined by claim 4 wherein the crop lifter auger is drivable by a gear drive having a drive shaft and a driven shaft, the driven shaft is connected to the crop lifter auger, and the drive shaft is oriented coaxially with the vertical pivot axis of the crop lifter auger, the drive shaft having a rotational axis.

8. The crop lifter auger as defined by claim 7 wherein the housing of the gear drive is pivotal jointly with the crop lifter auger, around the rotational axis of the drive shaft.

9. The crop lifter auger as defined by claim 8 wherein the crop lifter auger is driven by a universal joint.

10. The crop lifter auger as defined by claim 8 wherein the first end of the crop lifter auger is supported by a ball joint.

11. A crop intake assembly having a frame supporting picking units, the crop intake assembly is provided with a crop lifter auger, the crop lifter auger having a first end and a second end, the crop lifter auger driven by a drive shaft, the crop lifter auger is movably mounted on the first end and can be fixed into different positions at the second end; characterized in that the drive shaft is driven on the first end of the crop lifter auger wherein the first end of the crop lifter auger is the forward end as related to a forward direction of travel.

12. The crop intake assembly as defined by claim 11 wherein a first side wall is disposed below the crop lifter auger, the first side wall is connected to the rear end of the crop lifter auger and the altitude of which side wall is adjustable; the first side wall is disposed adjacent to a second side wall of the crop intake assembly.

13. A crop intake assembly as defined by claim 12 wherein the second side wall has a slot for receiving the first side wall.

14. A crop intake assembly as defined by claim 13 wherein the first side wall has an upper region which is trough-shaped and which partially surrounds the underside of the crop lifter auger.

* * * * *

UNITED STATES PATENT AND TRADEMARK OFFICE
CERTIFICATE OF CORRECTION

| | |
|---|---|
| PATENT NO. | : 7,043,891 B2 |
| APPLICATION NO. | : 10/824924 |
| DATED | : May 16, 2006 |
| INVENTOR(S) | : Clemens Rickert et al. |

It is certified that error appears in the above-identified patent and that said Letters Patent is hereby corrected as shown below:

Please note that the correct title should be:
        Crop LIFTER Auger For A Crop Intake Assembly
NOT Crop FILTER Auger For A Crop Intake Assembly Signed and Sealed this Second Day of January, 2007

JON W. DUDAS
*Director of the United States Patent and Trademark Office*